(12) United States Patent
Jin et al.

(10) Patent No.: US 10,347,922 B2
(45) Date of Patent: Jul. 9, 2019

(54) SEPARATOR ASSEMBLY FOR FUEL CELL AND METHOD OF MANUFACTURING THE SAME

(71) Applicants: Hyundai Motor Company, Seoul (KR); Kia Motors Corporation, Seoul (KR)

(72) Inventors: Sang Moon Jin, Gyeonggi-do (KR); Yoo Chang Yang, Gyeonggi-do (KR); Suk Min Baeck, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 138 days.

(21) Appl. No.: 15/586,749

(22) Filed: May 4, 2017

(65) Prior Publication Data

US 2017/0244115 A1    Aug. 24, 2017

Related U.S. Application Data

(62) Division of application No. 14/476,039, filed on Sep. 3, 2014, now abandoned.

(30) Foreign Application Priority Data

Dec. 24, 2013  (KR) .................. 10-2013-0162012

(51) Int. Cl.
*H01M 8/0297* (2016.01)
*H01M 8/0202* (2016.01)
(Continued)

(52) U.S. Cl.
CPC ..... *H01M 8/0297* (2013.01); *B29C 45/14336* (2013.01); *B29C 45/14467* (2013.01); *B29C 65/48* (2013.01); *H01M 8/0202* (2013.01); *H01M 8/0206* (2013.01); *H01M 8/0267* (2013.01); *H01M 8/0273* (2013.01); *H01M 8/0286* (2013.01); *B29C 45/14311* (2013.01); *B29C 2045/14459* (2013.01);
(Continued)

(58) Field of Classification Search
CPC ............ H01M 8/0206; H01M 8/0297; H01M 8/0202; H01M 8/0273; B29C 45/14336; B29C 2045/14459; B29C 2045/14532
USPC .................................................. 429/437, 400
See application file for complete search history.

(56) References Cited

U.S. PATENT DOCUMENTS

2009/0042086 A1    2/2009  Ishikawa et al.
2011/0195332 A1    8/2011  Goebel
(Continued)

FOREIGN PATENT DOCUMENTS

CN    101364648 A    2/2009
CN    102473931 A    5/2012
(Continued)

*Primary Examiner* — James M Erwin
(74) *Attorney, Agent, or Firm* — Mintz Levin Cohn Ferris Glovsky and Popeo, P.C.; Peter F. Corless

(57) ABSTRACT

A separator assembly for a fuel cell having an anode separator, a cathode separator, a cooling surface frame, and a gasket. In particular, the cooling surface frame is integrally bonded between peripheral portions of the anode separator and the cathode separator. Additionally, the gasket encloses the peripheral portions of the anode separator and the cathode separator between which the cooling surface frame is interposed.

5 Claims, 6 Drawing Sheets

(51) Int. Cl.

| | |
|---|---|
| *H01M 8/0206* | (2016.01) |
| *H01M 8/0273* | (2016.01) |
| *H01M 8/0286* | (2016.01) |
| *B29C 45/14* | (2006.01) |
| *B29C 65/48* | (2006.01) |
| *H01M 8/0267* | (2016.01) |
| *B29L 31/34* | (2006.01) |
| *B29L 31/26* | (2006.01) |

(52) U.S. Cl.
CPC .............. *B29C 2045/14532* (2013.01); *B29L 2031/265* (2013.01); *B29L 2031/3468* (2013.01); *Y02P 70/56* (2015.11)

(56) References Cited

U.S. PATENT DOCUMENTS

2011/0229790 A1* 9/2011 Sato .................... H01M 8/0278
429/469
2012/0251918 A1 10/2012 Morimoto et al.
2013/0309594 A1 11/2013 Rock et al.

FOREIGN PATENT DOCUMENTS

| JP | 2001-015132 A | 1/2001 |
|---|---|---|
| JP | 2007-172992 A | 7/2007 |
| KR | 10-2006-0014169 | 2/2006 |
| KR | 10-0820567 B1 | 4/2008 |
| KR | 10-2011-0080552 | 7/2011 |
| KR | 10-2012-0061643 | 6/2012 |
| KR | 10-2012-0116739 | 10/2012 |

* cited by examiner

| Specification of conventional technology | Specification of present technology |
|---|---|
| Compressive load : 2.5ton | Compressive load : 5.3ton |

FIG.5

SEPARATOR ASSEMBLY FOR FUEL CELL AND METHOD OF MANUFACTURING THE SAME

CROSS-REFERENCE TO RELATED APPLICATIONS

This application is a divisional application of U.S. patent application Ser. No. 14/476,039, filed Sep. 3, 2014, which claims under 35 U.S.C. § 119(a) the benefit of Korean Patent Application No. 10-2013-0162012, filed on Dec. 24, 2013, the entire contents of which are incorporated herein by reference.

BACKGROUND (a) Technical Field

The present invention relates to a separator assembly to be disposed in a fuel cell that structurally improves structural safety and the durability of a fuel cell stack and allows for mass-production of fuel cell stacks, and a method of manufacturing the same.

(b) Background Art

In general, fuel cells generate electric power by directly converting chemical energy generated by oxidation of a fuel into electric energy, and directly supply hydrogen produced by modifying or purifying a hydrocarbon-based fuel or a hydrocarbon-based fuel and air into a fuel cell stack to allow fuel and air to generate an electrochemical reaction and thus generate electrical energy.

In a fuel cell stack, a plurality of membrane-electrode assemblies (MEAs), each including an anode, a cathode, and an electrolyte membrane interposed between the anode and the cathode. A plurality of unit cells, each include separators for separating the membrane-electrode assembly, are stacked together to form a fuel cell stack.

Fuel cell stack separators may conventionally include graphite separators and metal separators. The manufacturing time and costs of the metal separators, however, are significantly reduced compared to graphite separators manufactured through machining or powdering. Since these separators are made of metal, the separators must be made thin in order to reduce the weight of the fuel cell stacks.

As a result, however, these metal separators have low strength and increase in their spring back as the thickness of the material decreases. This causes deterioration in the alignment of the stacks and an increase in error rates of the metal separators that influence mass-production of the stacks.

In a fuel cell stack in which a plurality of unit cells are stacked, an alignment error between adjacent unit cells and an alignment error between adjacent separators may occur. As such, it becomes more difficult to uniformly stack a separator, an MEA, and a GDL (gas dispersing layer) due to lack of strength and an increase of a spring back as the separator becomes thinner, and a possibility of generating an alignment error between adjacent separators that influences a structure and a performance of the stack.

Further, the fuel cell stacks require reaction gases (hydrogen and air) and cooling water to be sealed therein, and are provided on opposite surfaces of a metal separator. As such, fuel cell stacks are typically integrally injection-molded in a metal separator. However, as the metal separator becomes thinner, the quality of metal separator decreases. For example, deformation of a separator or generation of a gasket burr due to an injection-molding pressure may occur, and thus an error rate of the metal separators increases.

SUMMARY OF THE DISCLOSURE

The present invention provides a separator assembly for a fuel cell that improves the structural stability and durability of a fuel cell stack by structurally improving the strengths of an anode separator and/or a cathode separator, and mass-production of a stack can be insured, and a method of manufacturing the same.

In accordance with an aspect of the present invention, there is provided a separator assembly for a fuel cell, including: an anode separator; a cathode separator, a cooling surface frame integrally bonded between peripheral portions of the anode separator and the cathode separator; and a gasket enclosing the peripheral portions of the anode separator and the cathode separator between which the cooling surface frame is interposed at the same time.

In accordance with another aspect of the present invention, there is provided a method of manufacturing a separator assembly for a fuel cell, the method including: injection-molding a cooling surface frame at a peripheral portion of an inner surface of one selected from an anode separator and a cathode separator; stacking another separator on a cooling surface frame, and bonding the anode separator and the cathode separator; and injection-molding a gasket enclosing peripheral portions of outer surfaces of the anode separator and the cathode separator at the same time.

The gasket in the exemplary embodiment of the present invention may be bonded to the peripheral portions of the outer surfaces of the anode plate and the cathode plate at the same time as when the gasket is injection-molded, and an adhesive may be applied to a peripheral portion of an inner surface of a separator in which a cooling surface frame is not yet formed.

The cooling surface frame may be formed of a polymer resin, the polymer resin is one selected from the group consisting of polyamide (PA), polypropylene (PP), liquid crystal polymer (LCP), and the anode separator and the cathode separator may be metal separators formed of thin plates.

According to the separator assembly for a fuel cell of the exemplary embodiment of the present invention, the structural stability of a fuel cell stack can be improved, a performance of cells can be improved, and a deviation between performances of cells can be reduced by improving an alignment of stacks, thus allowing for the mass-production of fuel cell stacks.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein:

FIG. 5 is a view for comparing a result of evaluating structural safety of a fuel cell stack using the separator assembly for a fuel cell according to the exemplary embodiment of the present invention with that of a conventional stack.

Figure 1:
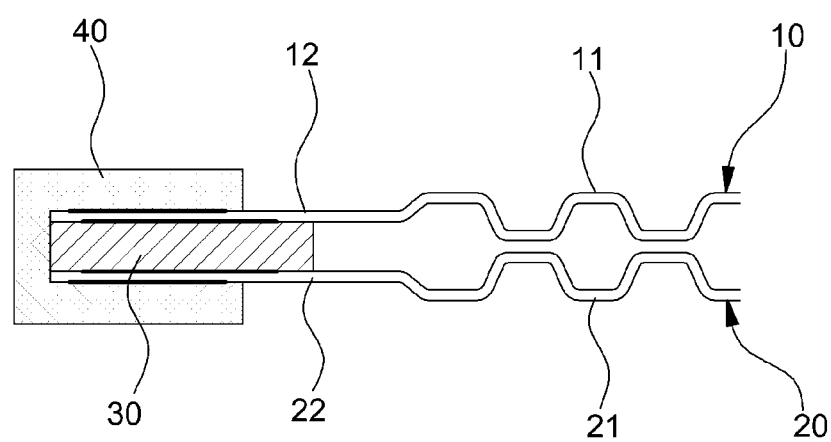
FIG. 1 is a view showing a separator assembly for a fuel cell according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described so that those skilled in the art to which the present invention pertains can easily carry out the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As shown in FIG. 1, a separator assembly according to an exemplary embodiment of the present invention includes an anode separator 10, a cathode separator 20, a cooling surface frame 30, and a gasket 40. The anode separator 10 and the cathode separator 20 may be thin separators formed of a metal. Each anode separator 10 and the cathode separator 20 has a bendable structure having a particular shape that is repeatedly bent at a central portion 11 and 21 thereof, and has a flat plate structure at a peripheral portion 12 and 22 integrally formed at an outer perimeter of the central portion 11 and 21 thereof.

The cooling surface frame 30 may be formed of a polymer resin and is injection-molded in an inner surface (cooling surface) of the anode separator 10 or an inner surface (cooling surface) of the cathode separator 20, and in particular, is formed at the peripheral portion 12 or 22 of the selected separator 10 or 20. Here, the anode separator 10 and the cathode separator 20 are bonded to each other, facing surfaces of the separators 10 and 20 are cooling surfaces (inner surfaces) and opposite surfaces thereof are reaction surfaces (outer surfaces).

Furthermore, the gasket 40 may enclose the peripheral portions 12 and 22 of the outer surfaces (reaction surfaces) of the anode separator 10 and the cathode separator 20 at the same time, and the peripheral portions 12 and 22 of the separators 10 and 20 may have a U-shaped cross-section. In detail, the gasket 40 may be attached to the reaction surface of the anode separator 10, the reaction surface of the cathode separator 20, and one surface (outer surface) of the cooling surface frame 30 interposed between the separators 10 and 20 to enclose them.

That is, the gasket 40 may enclose the peripheral portions 12 and 22 of the anode separator 10 and the cathode separator 20 between which the cooling surface frame 30 is interposed so that the separators 10 and 20 and the cooling surface frame 30 are sealed at an edge thereof.

Figure 2:
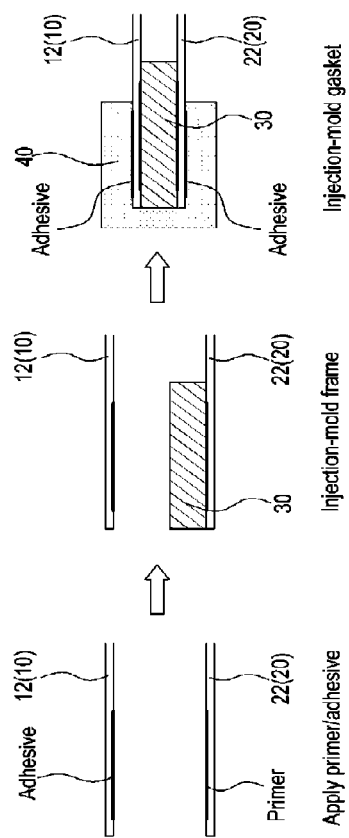
FIG. 2 is a view for explaining a manufacturing process of a separator assembly for a fuel cell according to an exemplary embodiment of the present invention.

The separator assembly having the integral structure seals cooling water and reaction gases (hydrogen and air) and structurally enhances strength of separators. As shown in FIG. 2, the separator assembly may be manufactured through a process of preparing the anode separator 10 and the cathode separator 20, a process of injection-molding the cooling surface frame 30 on an inner surface (cooling surface) of one of the separators, and a process of injection-molding the integral gasket at the peripheral portions 12 and 22 of the outer surfaces of the two separators 10 and 20.

First, the anode separator 10 and the cathode separator 20 of a thin plate type are manufactured, an adhesive is applied to the peripheral portion 12 of an inner surface of the anode separator 10 (or cathode separator) and a primer may be applied to the peripheral portion 22 of an inner surface of the cathode separator 20 (or anode separator). The adhesive and the primer may then be an adhesive and a primer generally used to manufacture a fuel cell stack.

The adhesive also may be applied to the peripheral portion 12 of the outer surface (reaction surface) of the anode separator 10 and the peripheral portion 22 of the outer surface (reaction surface) of the cathode separator 20 for bonding of the gasket. In this case, since the gasket 40 is integrally bonded to the outer surfaces of the two separators 10 and 20 at the same time as when it is injection-molded, applying the adhesive to the peripheral portions 11 and 12 of the outer surfaces (reaction surfaces) of the separators 10 and 20 for bonding of the gasket 40 may be omitted.

Next, the cooling surface frame 30 for sealing cooling water therein is injection-molded at the peripheral portion 22 of the inner surface of the cathode separator 20 (or anode separator) on which the primer is applied. The material of the cooling surface frame 30 is a polymer resin, such as plastic, which has little resiliency as compared with the material (fluorine, silicon, or EPDM) of the gasket for a general fuel cell. In detail, the material of the cooling surface frame 30 is a resin such as plastics (e.g., polyamide (PA), polypropylene (PP), and liquid crystal polymer (LCP)) or a bonding sheet containing a resin substance. When a bonding sheet containing a resin substance is used as the material of the cooling surface frame 30, the bonding sheet is cut into a predetermined size and a predetermined thickness to form the cooling surface frame 30.

The cooling surface frame 30 formed at the peripheral portion 22 of the cooling surface to which the primer is applied is bonded to the peripheral portion 22 of the cooling surface of the cathode separator 20 (or anode separator) while the cooling surface frame 30 is injection-molded, and then the peripheral portion 12 of the anode separator 10 (or cathode separator) to which the adhesive is applied is stacked to be integrally bonded between the anode separator 10 and the cathode separator 20.

In addition to a bonding method using an adhesive, lamination, laser bonding, or thermal fusion may be applied to bond the cooling surface frame 30 between the two separators 10 and 20. Subsequently, the gasket 40 may be injection-molded at the peripheral portions 12 and 22 of the outer surfaces of the anode separator 10 and the cathode separator 20.

Additionally, the anode separator 10 and the cathode separator 20 between which the cooling surface frame 30 is integrally interposed are introduced into an injection-molding mold and the material of a gasket is injected into the mold to form the gasket 40.

The gasket 40 may enclose the peripheral portion 12 of the outer surface of the anode separator 10, the peripheral portion 22 of the outer surface of the cathode separator 20, and one surface of the cooling surface frame 30, and may be bonded to the anode separator 10 and the cathode separator 20 at the same time when the gasket 40 is injection-molded.

That is, the gasket 40 may be integrally bonded to the peripheral portions 12 and 22 of the outer surfaces of the anode separator 10 and the cathode separator 20 while the gasket 40 is being injection-molded, and thus a separate bonding process of bonding the gasket 40 to the separators 10 and 20 after the gasket 40 is formed may be omitted.

Also, the separators 10 and 20 and the cooling surface frame 30 may be sealed by an edge while the gasket 40 is being formed at the peripheral portions 12 and 22 of the anode separator 10 and the cathode separator 20 between which the cooling frame 30 is interposed. As such, the gasket may be made of fluorine, silicon, EPDM (Ehtylene Propylene Diene Monomer) or a combination thereof.

The cooling surface frame 30, in the exemplary embodiment of the present invention, supports the two separators 10 and 20 in the insert-molding mold to structurally enhance strength of the separators 10 and 20, and thus a spring back of the two separators 10 and 20 can be reduced so that deformation of the separators and generation of a burr in the gasket can be prevented.

According to the present invention, the cooling surface frame 30 formed of a polymer resin may be integrated between the anode separator 10 and the cathode separator 20 to effectively seal cooling water therein and strengthen the separators, so that the cooling surface frame 30 supports the thin plate type separators 10 and 20 and significantly reduce error rates of products. As such, additional costs generated due to the manufacturing of the cooling surface frame 30 can be offset by reducing the number of steps in an overall injection-molding process (an injection-molding process necessary for manufacturing the separator assembly).

Meanwhile, the results of FIGS. 3 to 6 were obtained by performing various evaluations on the separator assembly for a fuel cell stack manufactured as described above. FIGS. 3 to 6 show results obtained by comparing effects of the separator assembly according to the present invention with those of a conventional one.

Figure 3:
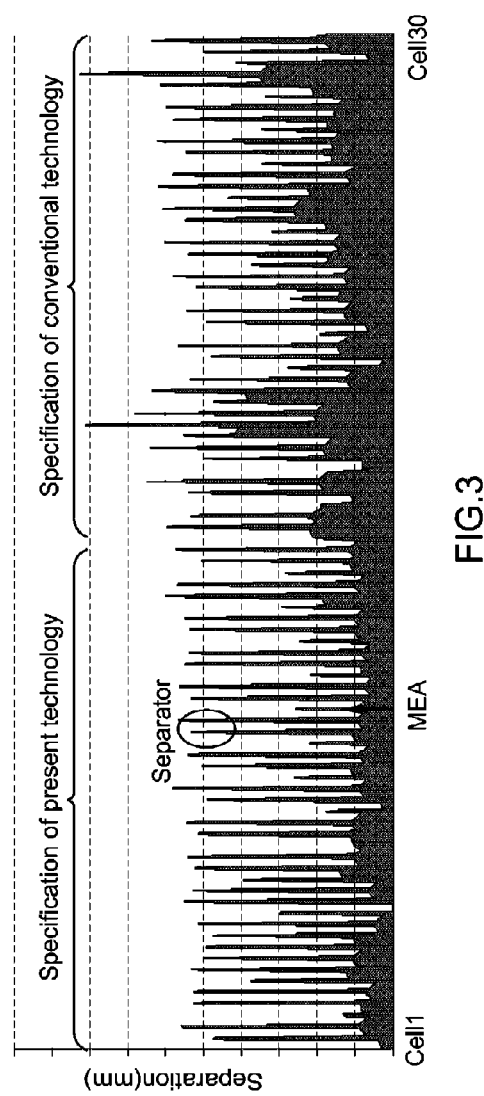
FIG. 3 is a view for comparing a result of measuring an alignment degree of a fuel cell stack using the separator assembly for a fuel cell according to the exemplary embodiment of the present invention with that of a conventional stack.
Figure 4:
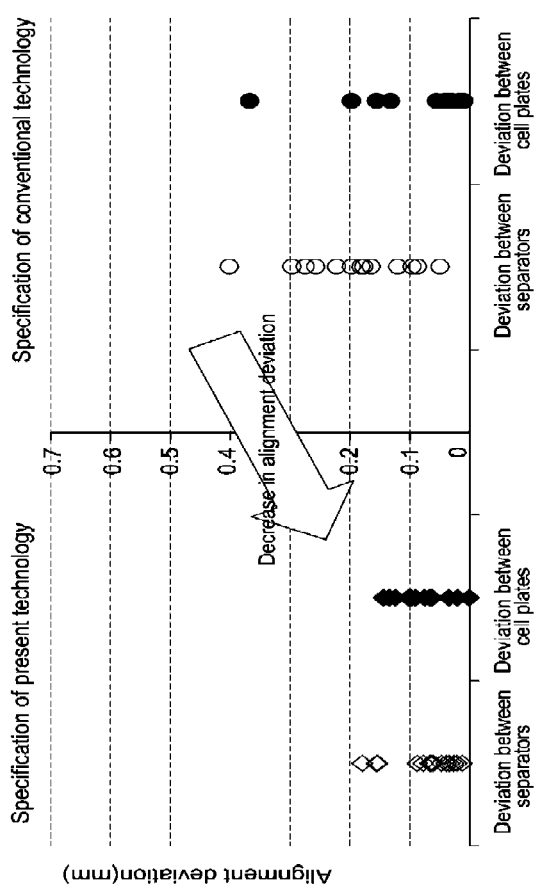
FIG. 4 is a view for comparing a result of analyzing an alignment deviation of a fuel cell stack using the separator assembly for a fuel cell according to the exemplary embodiment of the present invention with that of a conventional stack.
Figure 6:
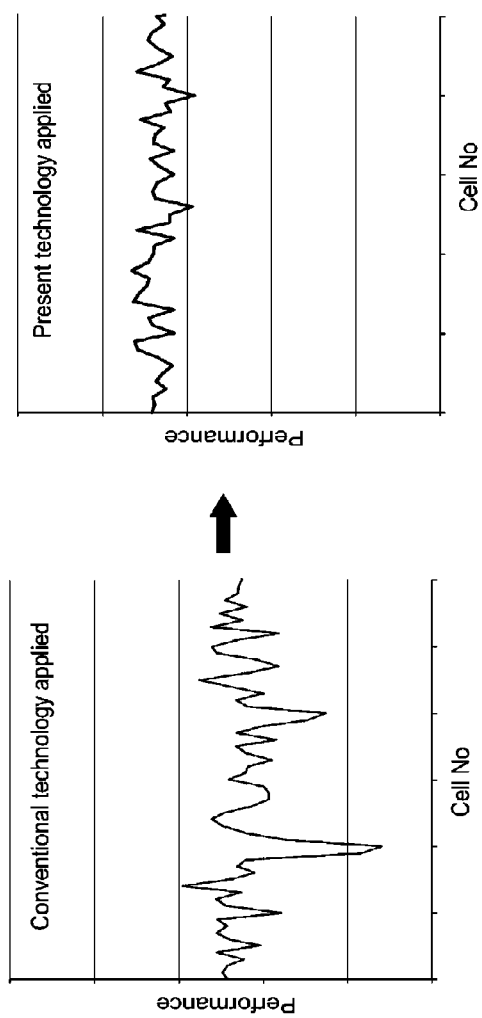
FIG. 6 is a view for comparing a result of evaluating a unit cell performance of a fuel cell stack using the separator assembly for a fuel cell according to the exemplary embodiment of the present invention with that of a conventional stack.

FIG. 3 comparative results based on measurements of an alignment degree of a fuel cell stack using the separator assembly for a fuel cell according to the exemplary embodiment of the present invention with that of a conventional stack, FIG. 4 is a view for comparing a result of analyzing an alignment deviation of a fuel cell stack using the separator assembly for a fuel cell according to the embodiment of the present invention with that of a conventional stack. FIG. 5 is a view for comparing a result of evaluating structural safety of a fuel cell stack using the separator assembly for a fuel cell according to the embodiment of the present invention with that of a conventional stack. FIG. 6 is a view for comparing a result of evaluating a unit cell performance of a fuel cell stack using the separator assembly for a fuel cell according to the embodiment of the present invention with that of a conventional stack.

Results obtained by scanning outer perimeter of fuel cell stacks manufactured by using separator assemblies and measuring alignment degrees of the stacks with a displacement sensor are shown in FIG. 3, and scanning values of the cells constituting the stacks are shown by deviation values between adjacent separators and adjacent cells.

As shown in FIG. 3, it can be seen that the fuel cell stacks using the separator assembly according to the present invention has substantially similar separations between unit cells to show an excellent alignment in comparison with a conventional fuel cell stack.

As shown in FIG. 4, it can be seen that the fuel cell stack using the separator assembly according to the present invention has a low deviation between adjacent separators and a low deviation between adjacent cells as compared with a conventional fuel cell stack.

Results obtained by measuring compressive loads of separators (separator manifold) using separator assemblies and evaluating structural safety of the fuel cell stack after applying a load to the fuel cell stack (about 50% of the stack area is pressed) are shown in FIG. 5. Then, structural safeties were evaluated by using the compressive loads of the separators (separator manifold) that is most vulnerable.

As shown in FIG. 5, it can be seen that the compressive load of the fuel cell stack using the separator assembly according to the present invention is remarkably decreased as compared with that of a conventional fuel cell stack. For reference, structural safety of the fuel cell stack increases as the compressive load thereof becomes higher.

Results obtained by measuring performances of unit cells of fuel cell stacks using separator assemblies are shown in FIG. 6. As shown in FIG. 6, it can be seen that a cell performance of the fuel cell stack using the separator assembly according to the present invention is improved and a deviation between performances of cells is improved as compared with those of the conventional fuel cell stack.

As described above, the separator assembly according to the present invention has the following effects.

1. Due to an increase in strength of a separator, the separator can be manufactured of a thin plate and an injection-molding performance of a gasket can be improved.

2. When a fuel cell stack is manufactured, a manufacturing time of the fuel cell stack can be shortened and an alignment of the stack can be improved due to a decrease in the number of stacked parts.

The stacking process of a conventional fuel cell stack is calculated by (anode separator+cathode separator+MEA/GDS)*(the number of cells), and the stacking process of the fuel cell stack using a separator assembly according to the present invention is calculated by (separator assembly+MEA/GDL)*(the number of cells).

Thus, the number of assembly processes and the manufacturing time are each reduced in comparison with a conventional process, and investment costs are also reduced due to a decrease in difficulty of equipment used in a stacking process.

3. A safety of the structure of a fuel cell stack can be increased, the performance of cells can be improved, and a deviation between performances of cells can be reduced through improvement of an alignment of the stack.

Although the invention has been described in detail with reference to preferred embodiment thereof, it will be appreciated by those skilled in the art that the embodiment may be modified without departing from the principle and spirit of the invention, the scope of which is defined in the appended claims and their equivalents.

What is claimed is:

1. A method of manufacturing a separator assembly for a fuel cell, the method comprising:
   injection-molding a cooling surface frame at a peripheral portion of an inner surface of one separator selected from an anode separator or a cathode separator;
   stacking another separator on a cooling surface frame;
   bonding the anode separator and the cathode separator; and
   injection-molding a gasket enclosing peripheral portions of outer surfaces of the anode separator and the cathode separator at the same time,
   wherein the cooling surface frame supports the anode separator and the cathode separator, and
   wherein the gasket seals the edges of the anode separator, the cathode separator, and the cooling surface frame.

2. The method of claim 1, wherein the gasket is bonded to the peripheral portions of the outer surfaces of the anode separator and the cathode separator at the same time as when the gasket is injection-molded.

3. The method of claim 1, wherein an adhesive is applied to a peripheral portion of an inner surface of a separator in which a cooling surface frame is not formed yet.

4. The method of claim 1, wherein the cooling surface frame is formed of a polymer resin, the polymer resin is one selected from the group consisting of polyamide (PA), polypropylene (PP), and liquid crystal polymer (LCP).

5. The separator assembly of claim 1, wherein the anode separator and the cathode separator are respectively metal separators formed as thin plates.

* * * * *